(12) United States Patent
Eckhardt et al.

(10) Patent No.: US 9,816,679 B2
(45) Date of Patent: *Nov. 14, 2017

(54) LIGHT ASSEMBLY

(71) Applicant: 3M INNOVATIVE PROPERTIES COMPANY, St. Paul, MN (US)

(72) Inventors: Stephen K. Eckhardt, White Bear Lake, MN (US); Barry S. Carpenter, Oakdale, MN (US); David A. Ender, New Richmond, WI (US); David J. Lundin, Woodbury, MN (US); Mark E. Napierala, St. Paul, MN (US); Jennifer J. Sahlin, Minneapolis, MN (US); David F. Slama, City of Grant, MN (US); Karl A. Vick, Elko, MN (US); John A. Wheatley, Lake Elmo, MN (US)

(73) Assignee: 3M Innovative Properties Company, St. Paul, MN (US)

(*) Notice: Subject to any disclaimer, the term of this patent is extended or adjusted under 35 U.S.C. 154(b) by 88 days.

This patent is subject to a terminal disclaimer.

(21) Appl. No.: 14/926,332

(22) Filed: Oct. 29, 2015

(65) Prior Publication Data

US 2016/0047521 A1     Feb. 18, 2016

Related U.S. Application Data

(63) Continuation of application No. 13/265,627, filed as application No. PCT/US2010/032161 on Apr. 23, 2010, now Pat. No. 9,200,775.

(Continued)

(51) Int. Cl.
    *F21V 5/02*        (2006.01)
    *F21S 8/10*        (2006.01)
             (Continued)

(52) U.S. Cl.
    CPC ............. *F21S 48/234* (2013.01); *F21S 48/215* (2013.01); *F21S 48/2212* (2013.01); *F21S 48/24* (2013.01); *G02B 5/124* (2013.01); *G02B 6/001* (2013.01); *F21S 48/2225* (2013.01); *F21S 48/23* (2013.01); *F21V 23/0442* (2013.01)

(58) Field of Classification Search
    CPC ....... F21S 48/215; F21S 48/2212; F21S 48/24; F21S 48/234; F21S 48/2225; F21S 48/23; F21V 23/0442; G02B 5/124; G02B 6/001
    See application file for complete search history.

(56) References Cited

U.S. PATENT DOCUMENTS 3,532,871 A    10/1970   Shipman
3,924,929 A    12/1975   Holmen et al.
(Continued)

FOREIGN PATENT DOCUMENTS

DE       19850443     4/2003
EP         1512578     9/2003
(Continued)

*Primary Examiner* — Y M. Lee
(74) *Attorney, Agent, or Firm* — Robert S. Moshrefzadeh

(57) ABSTRACT

Light assembly having reflector, light source, an outer light cover, and a curved transflective surface. Embodiments of light assemblies described herein are useful, for example, as signs, backlights, displays, task lighting, luminaire, and vehicle (e.g., cars, trucks, airplanes, etc.) components. Vehicle comprising light assemblies include those where the light assembly is a vehicle tail light assembly

12 Claims, 5 Drawing Sheets

Related U.S. Application Data

(60) Provisional application No. 61/172,489, filed on Apr. 24, 2009.

(51) Int. Cl.
  *G02B 5/124* (2006.01)
  *F21V 8/00* (2006.01)
  *F21V 23/04* (2006.01)

(56) References Cited

U.S. PATENT DOCUMENTS

| | | | |
|---|---|---|---|
| 4,510,560 A | 4/1985 | Negishi | |
| 4,588,258 A | 5/1986 | Hoopman | |
| 4,729,076 A | 3/1988 | Masami et al. | |
| 4,775,219 A | 10/1988 | Appledorn et al. | |
| 4,799,131 A | 1/1989 | Aho et al. | |
| 4,929,866 A | 5/1990 | Murata et al. | |
| 4,952,023 A | 8/1990 | Bradshaw et al. | |
| 4,977,487 A | 12/1990 | Okano | |
| 4,981,835 A | 1/1991 | Iwakura et al. | |
| 4,984,144 A | 1/1991 | Cobb et al. | |
| 5,097,395 A | 3/1992 | Aho et al. | |
| 5,122,902 A | 6/1992 | Benson | |
| 5,138,488 A | 8/1992 | Szczech | |
| 5,190,370 A | 3/1993 | Miller et al. | |
| 5,450,235 A | 9/1995 | Smith et al. | |
| 5,455,747 A | 10/1995 | Aoyama | |
| 5,614,286 A | 3/1997 | Bacon, Jr. et al. | |
| 5,840,405 A | 11/1998 | Shusta et al. | |
| 5,940,212 A | 8/1999 | Johnson et al. | |
| 5,948,488 A | 9/1999 | Marecki et al. | |
| 6,045,243 A | 4/2000 | Muth et al. | |
| 6,286,984 B1 | 9/2001 | Berg | |
| 6,287,670 B1 | 9/2001 | Benson et al. | |
| 6,485,170 B2 | 11/2002 | Natsume | |
| 6,530,683 B1 | 3/2003 | Ohkohdo et al. | |
| 6,531,230 B1 | 3/2003 | Weber et al. | |
| 6,563,993 B1 | 5/2003 | Imamura et al. | |
| 6,619,825 B2 | 9/2003 | Natsume | |
| 6,752,505 B2 | 6/2004 | Parker et al. | |
| 6,771,335 B2 | 8/2004 | Kimura et al. | |
| 6,908,220 B2 | 6/2005 | Misawa et al. | |
| 6,924,014 B2 | 8/2005 | Ouderkirk et al. | |
| 6,991,357 B2 | 1/2006 | Wimbert et al. | |
| 7,329,012 B2 | 2/2008 | Smith | |
| 7,364,421 B2 | 4/2008 | Erickson et al. | |
| 7,419,287 B2 | 9/2008 | Gasquet | |
| 7,437,050 B2 | 10/2008 | Bourdin et al. | |
| 7,452,114 B2 | 11/2008 | Gasquet | |
| 7,537,374 B2 | 5/2009 | Schardt et al. | |
| 7,695,179 B2 | 4/2010 | Eichelberger | |
| 7,695,180 B2 | 4/2010 | Schardt et al. | |
| 7,815,355 B2 | 10/2010 | Thompson et al. | |
| 8,608,363 B2 | 12/2013 | Weber et al. | |
| 2005/0024754 A1 | 2/2005 | Epstein et al. | |
| 2007/0031641 A1 | 2/2007 | Frisch et al. | |
| 2009/0086464 A1 | 4/2009 | Takahira | |
| 2009/0211130 A1 | 8/2009 | Hoffman et al. | |
| 2011/0096529 A1 | 4/2011 | Wheatley et al. | |

FOREIGN PATENT DOCUMENTS

| | | |
|---|---|---|
| EP | 1496489 | 1/2005 |
| EP | 1657694 | 10/2005 |
| FR | 2785973 | 5/2000 |
| JP | 2005-174652 | 6/2005 |
| WO | WO 2003/038335 | 5/2003 |
| WO | WO 2011/07305 | 1/2011 |

LIGHT ASSEMBLY

BACKGROUND

Light source applications are well known in the art, and include those that are configured so that light is emitted relatively uniformly over a given area in a given, desired direction. The degree of uniformity and the degree of aiming are dictated by the specific application, but the emitting area is generally comparable to the device that is being illuminated.

Common applications for lighting include backlights for displays and signs as well as vehicular lights. A liquid crystal display (LCD) is commonly used in laptop computers, monitors and televisions. Because a liquid crystal produces no light of its own, but simply modulates light, it is common practice to provide directed area lighting, called a backlight, behind the LCD. This backlight is roughly the same size as the LCD and provides a beam that is directed through the LCD toward the viewer. One type of backlight commonly comprises at least one fluorescent lamp illuminating the edges of a plastic light guide. Light is extracted from the light guide via light extraction features on the surface of the light guide (e.g., bumps, pits, and paint dots).

Illuminated signs, of the type that comprise an internal light source and a translucent outer cover with text and/or graphics formed on it, are another application of directed area lighting. One common internal light source for this application is a row of fluorescent bulbs, with the uniformity requirements being met by placing diffuser plates between the bulbs and the outer cover.

Vehicular lights (e.g., headlights and taillights) are also examples of directed area lighting. For example, SAE J586 JUL2007, Section 6.4.2, published July, 2007, calls out a minimum lighted area of 50 cm$^2$ for brake lights, and gives details on how this is to be interpreted. In addition, FIGS. 3 to 5 and the associated text in Section 5.1.5 specify the minimum and maximum intensity that needs to be emitted in certain directions.

Several types of suitable light sources are available, and include incandescent bulbs, fluorescent tubes, discharge lamps and light emitting diodes (LED's). Recent developments in LED technology have made them among the most efficient.

A limitation common to all of the above applications is that they are to some extent limited to flat displays. Automotive lights appear to circumvent this limitation by having a curved outer surface, but they are still limited in the sense that the light is still strongly directed irrespective of the curve. For example, typical taillights comprise an incandescent bulb in a parabolic reflector. This reflector directs the light through the outer cover of the lens with minimal deviation; only scattering due to rough surfaces causes a small amount of light to be distributed over the area of the taillight. More conspicuous is the flatness of signs and LCD's. Both of these could, in some instances, benefit from curvature but they are limited by the available types of directed area lights to substantially flat forms.

Another limitation of the prior art is its inability to redirect light around a corner. For example, if the directed area light were in the shape of a 'U' or a '7', it would be difficult for the existing technologies to uniformly illuminate the entire light.

SUMMARY

In one aspect, the present disclosure describes an article comprising:
  a transflective surface, at least a portion of which is curved; and
  a reflector having a major surface that is substantially parallel to at least 30 (in some embodiments, at least 35, 40, 45, 50, 55, 60, 65, 70, 75, 80, 85, or even at least 90) percent by area of the curved portion of the transflective surface. Typically, the curvature of the transflective major surface, as well as the corresponding parallel portion of the reflector, is a convex curvature (e.g., as shown FIGS. 1A, 2, 3, 4, and 10). In some embodiments, at least a portion of the reflector is also transflective. In some embodiments, the transflective surface is a film having a transflective surface and/or an embossed surface. The article is useful, for example, in making lighting assemblies.

In another aspect, the present disclosure describes a first light assembly comprising:
  an outer light cover having an outer major surface;
  a curved transflective surface;
  a reflector having an inner major surface that is substantially parallel to at least 30 (in some embodiments, at least 35, 40, 45, 50, 55, 60, 65, 70, 75, 80, 85, or even at least 90) percent by area of the curved portion of the transflective surface, wherein the curved transflective surface is disposed between the outer major surface of the outer light cover and the inner major surface of the reflector; and
  a first light source,
wherein there is an optical cavity between the outer light cover and the reflector, and wherein the first light source is positioned to introduce light into the optical cavity. In some embodiments, the outer light cover further comprises an inner major surface, and at least 30 (in some embodiments, at least 35, 40, 45, 50, 55, 60, 65, 70, 75, 80, 85, or even at least 90) percent by area of the inner major surface of the outer light cover is the curved portion of the transflective surface (e.g., as shown 1A, 2, 3, 4, and 10). Typically, the curved portion of the transflective surface, as well as the corresponding curved portion of the reflector, has a convex curvature. In some embodiments, at least a portion of the reflector is also transflective.

In another aspect, the present disclosure describes a second light assembly comprising:
  an outer (often curved) light cover having an inner major surface at least a portion of which is transflective wherein at least a portion of the transflective surface is curved;
  a reflector having a curved inner major surface; and
  a first light source,
wherein there is an optical cavity between the outer light cover and the reflector, and wherein the first light source is positioned to introduce light into the optical cavity, wherein the curved inner major surface of the reflector is oriented to the curved portion of the transflective surface so that the separation between the two surfaces decreases along a distance away from the light source, and wherein the maximum local ratio of decrease in separation (depth) to distance is less than 0.8:1 (in some embodiments, less than 0.7:1, 0.6:1, 0.5:1, 0.4:1, 0.35:1 0.3:1, 0.25:1, 0.2:1, 0.15:1, 0.1:1, or even less than 0.05:1). Typically, the curved portion of the transflective major surface, as well as the corresponding curved portion of the reflector, has a convex curvature. In some embodiments, at least a portion of the reflector is also transflective.

"Curved surface" as used herein refers to a surface that departs from planar by at least 2% (in some embodiments, at least 3%, 4%, or even at least 5%) of the longest dimension of the surface (i.e., the percent ratio of the maximum distance of a tangent plane (as measured by the tangent normal) from any point on the surface to the longest dimension of the surface is at least 2% (in some embodiments, at least 3%, 4%, or even at least 5%)).

In some embodiments of the first and second light assemblies described herein, the outer light cover comprises an outer part secured to an (e.g., rigid plastic) inner part, and wherein the inner part includes the transflective surface. In some embodiments, the transflective surface is a film having a transflective surface. In some embodiments, the transflective surface is molded or embossed into inner surface of the outer light cover.

Optionally, light assemblies as described herein further comprise a diffuser disposed between the outer light cover and the major transflective surface.

In some embodiments of the first and second light assemblies described herein, the transflective surface includes a first region with a first group of structures and a second region with a second, different group of structures. In some embodiments of the first and second light assemblies described herein, the inner surface of the reflector includes a first region with a first group of structures and a second region with a second, different group of structures.

Embodiments of light assemblies described herein are useful, for example, as signs, backlights, displays, task lighting, luminaire, vehicle (e.g., cars, trucks, airplanes, etc.) components. Vehicle comprising light assemblies include those where the light assembly is a vehicle tail light assembly.

DETAILED DESCRIPTION

Figure 1:
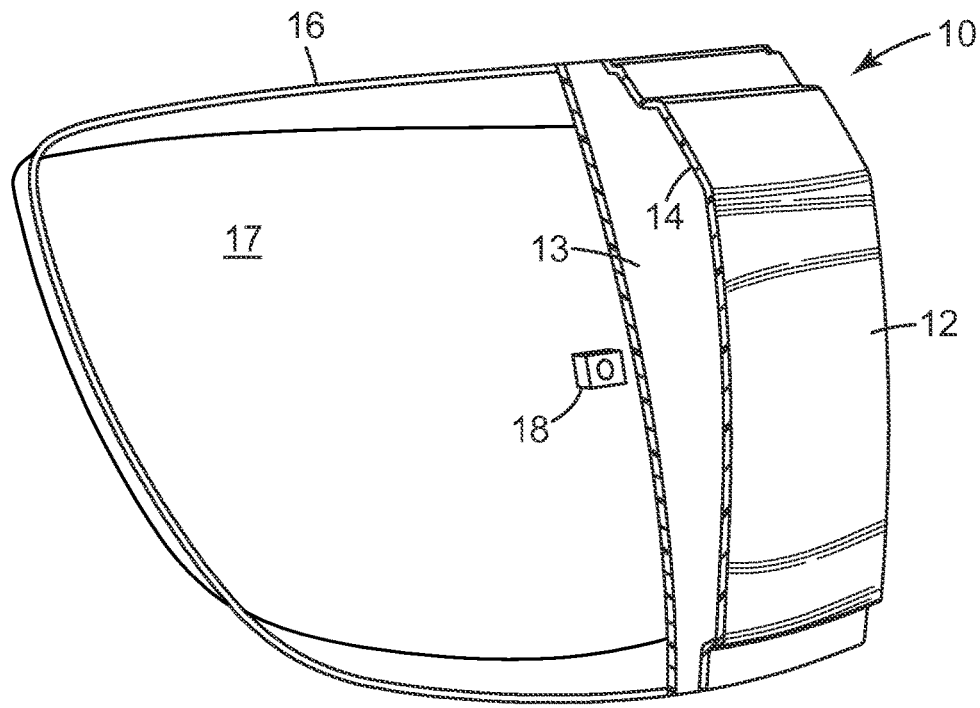
FIGS. 1 and 1A are perspective cutaway views of an exemplary light assembly of the present disclosure.
Figure 1A:
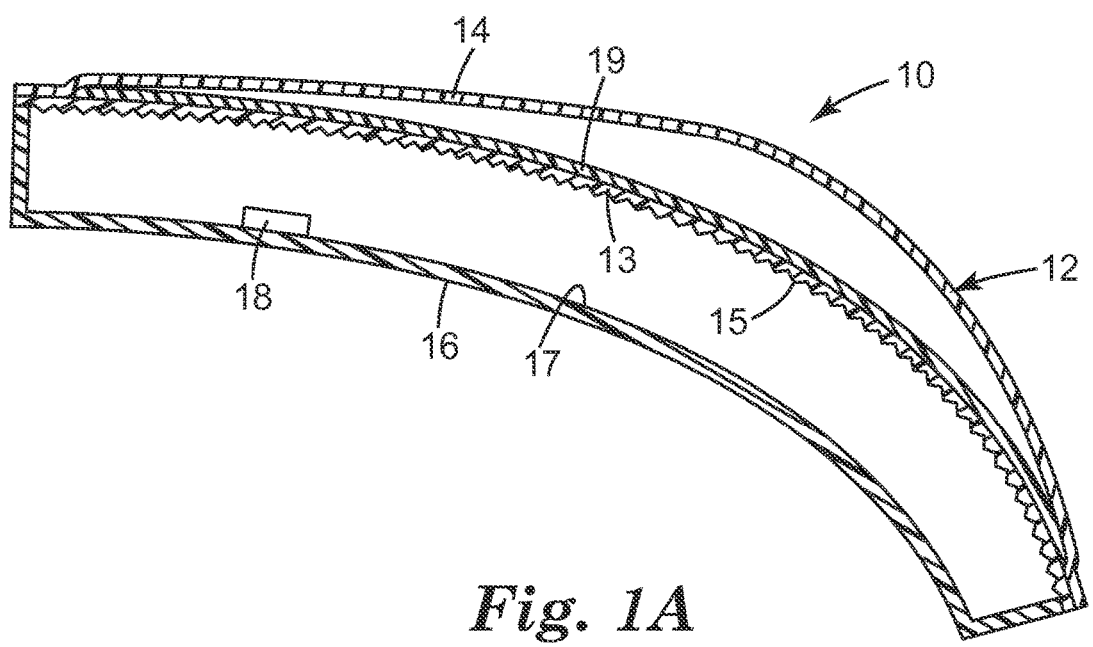

Referring to FIGS. 1 and 1A, an exemplary light assembly of the present disclosure is shown. Automobile tail light assembly 10 has curved outer light cover 12, reflector 16 having inner major surface 17, and light emitting diode 18. Outer light cover 12 is made up of two pieces 13, 14, wherein the former (13), has major transflective surface 15. Optionally, diffuser 19 is disposed between outer light cover 12 and major transflective surface 15.

Figure 2:
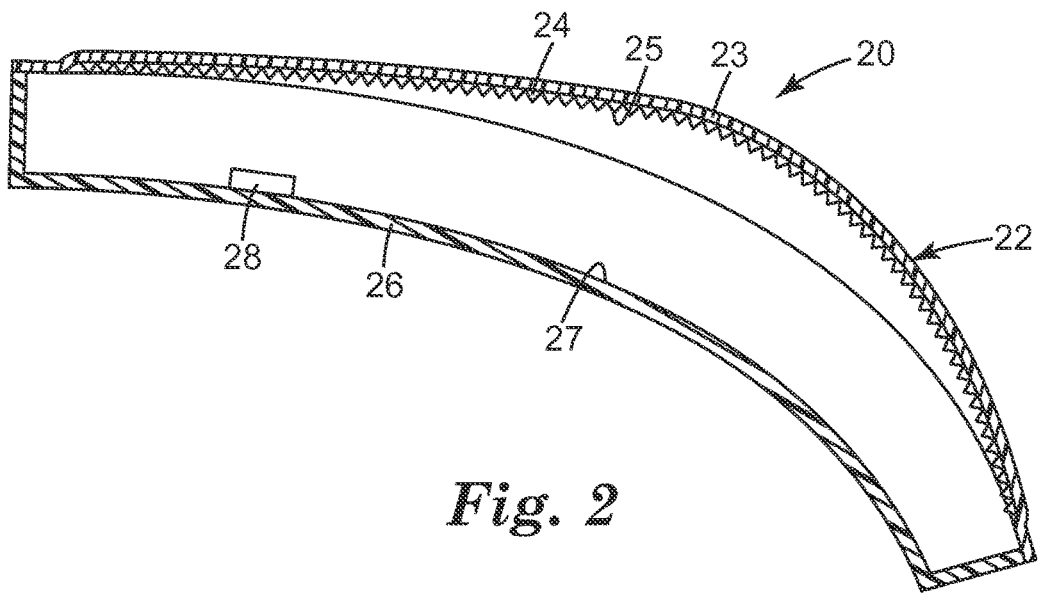
FIGS. 2 (including 2A)-4 are perspective cross-sectional views of exemplary embodiments of light assemblies of the present disclosure.

Referring to FIG. 2, another exemplary light assembly of the present disclosure is shown. Light assembly 20 has curved outer light cover 22, reflector 26 having inner major surface 27, and light emitting diode 28. Film 24 having major transflective surface 25 is attached to inner major surface 23 of outer light cover 22.

Figure 2A:
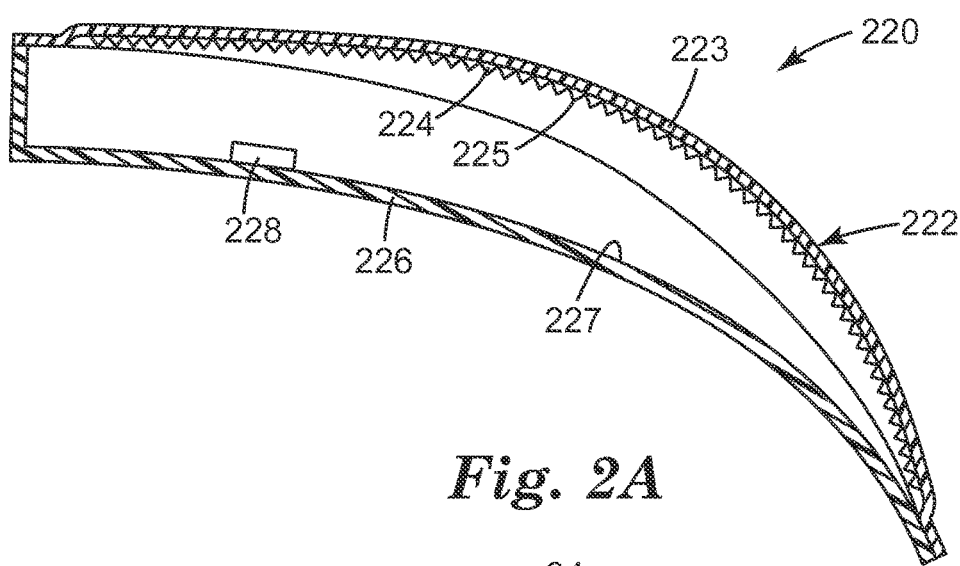

Referring to FIG. 2A, another exemplary light assembly of the present disclosure is shown. Light assembly 220 has curved outer light cover 222, reflector 226 having inner major surface 227, and light emitting diode 228. Film 224 having major transflective surface 225 is attached to inner major surface 223 of outer light cover 222.

Figure 3:
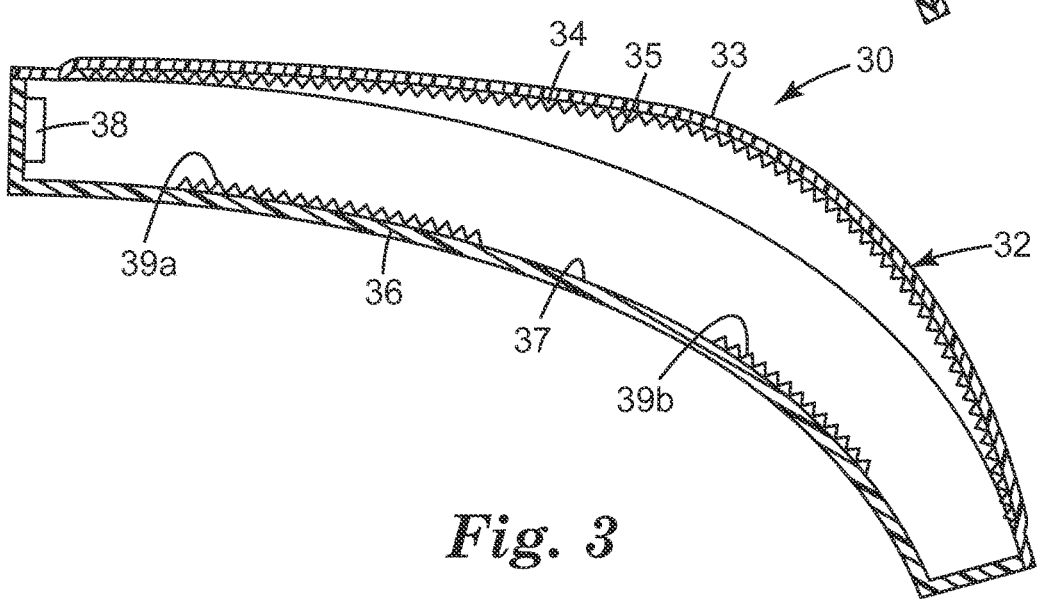

Referring to FIG. 3, another exemplary light assembly of the present disclosure is shown. Light assembly 30 has curved outer light cover 32, reflector 36 having inner major surface 37, and light emitting diode 38. Film 34 having major transflective surface 35 is attached to inner major surface 33 of outer light cover 32.

Figure 4:
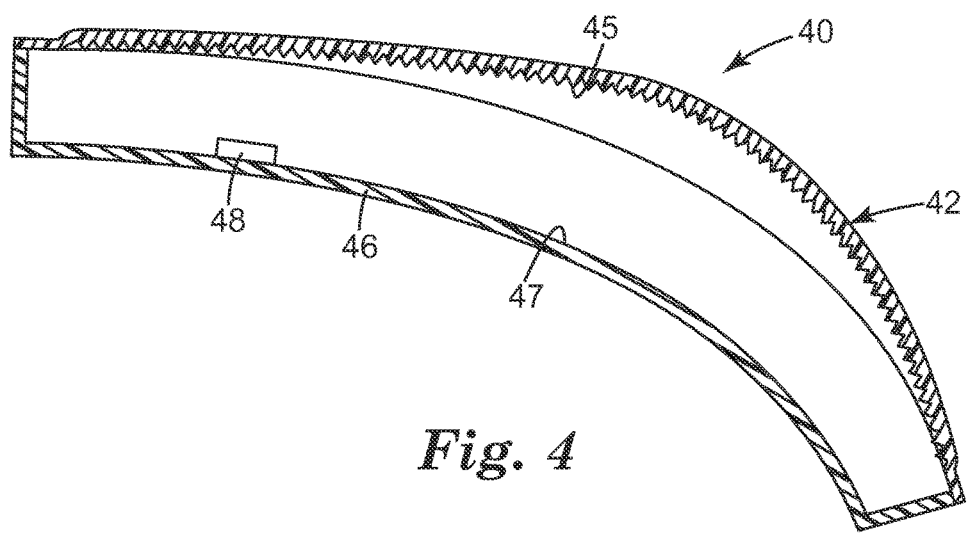

Referring to FIG. 4 another exemplary light assembly of the present disclosure is shown. Light assembly 40 has curved outer light cover 42 having inner, molded transflective major surface 45, reflector 46 having inner major surface 47, and light emitting diode 48.

Figure 5:
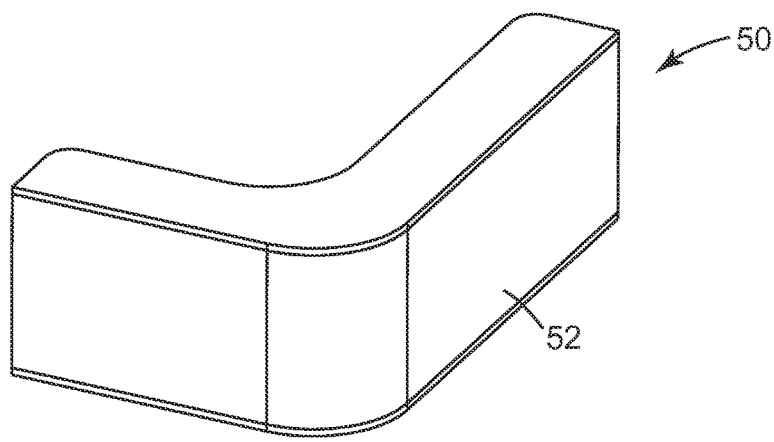
FIGS. 5 and 6 are perspective views of exemplary shapes of light assemblies of the present disclosure.
Figure 6:
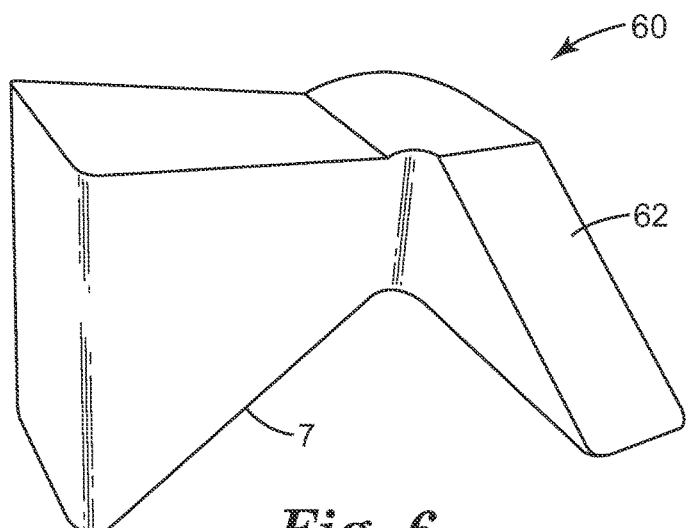

Other exemplary shapes of light assemblies of the present disclosure are shown in FIGS. 5 and 6. Referring to FIG. 5 and light assembly 50, 60, respectively, has outer light cover 52, 62, respectively.

The length to depth ratio of the light assembly is understood to be calculated from the length and depth of the light assembly. Length is determined by measuring the longest dimension of the outer cover. For instance, in FIG. 5, the longest dimension is found by measuring from one end of the outer cover around the bend to the other end. In FIG. 6, the longest dimension is from the base of the "7" to the top at either the right or left side, whichever is longer. Depth is determined by taking one or more cross-sections of the light assembly and measuring from the inner surface of the outer cover to closest point on the inner surface of the reflector. The depth is the greatest such measurement.

Figure 7:
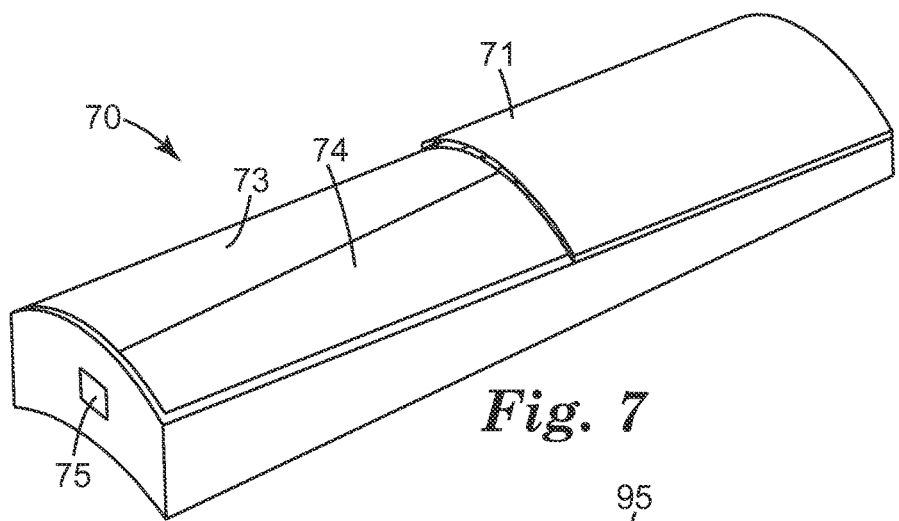
FIG. 7 is perspective view of another exemplary light assembly of the present disclosure.

Referring to FIG. 7, exemplary light assembly 70 having outer light cover 71, reflector 73, light source 75, and shows the decrease in separation between outer light cover 71 and inner major surface 74 of reflector 73.

Outer light covers are known in the art and typically comprise a plastic or other semi-transparent material which can be made, for example, by injection molding, thermoforming, etc., wherein semi-transparent means a majority of the light of the desired wavelengths is transmitted. For example, in a vehicular taillight a red plastic such as polymethylmethacrylate or polycarbonate is used to transmit the wavelengths specified by SAE J578 for such applications.

Particular applications may lend themselves to desired thicknesses and or shapes of the outer cover. Typically, the thickness of the rigid outer cover is in a range from about 0.5 mm to about 10 mm, although other thickness may also be useful. The shape of the outer cover may be in any of a variety of shapes, including those known in the art. The shape of the outer cover is typically chosen for aesthetic or functional reasons. A few exemplary shapes for exemplary light assemblies described herein are shown in FIGS. 1-7.

"Transflective" as used herein means partly reflecting and partly transmitting, although there may also be some absorption (i.e., less than 5% at the operating wavelength of the light assembly). The operating wavelengths are those at which the device is designed to operate. For example, a tail light is designed to be red, so its operating wavelengths are generally greater than 610 nm. Absorption at shorter wavelengths is not within the operating spectrum. Another example would be a sign with a multicolored image on it. Such a sign would generally need to be illuminated with white light so that all of the colors in the image would be illuminated, so absorption should be less than 5% across the visible spectrum. It is understood that in some embodiments a dye or other light absorber may be added to a transflective component that increases its absorption to greater than 5% to produce (e.g., a particular color or degree of transmittance), although the transflective function remains.

Additionally, it is recognized that all transparent materials reflect some light, as given by the Fresnel equations, so transflective is further understood to have reflectivity greater than that dictated by the Fresnel equations at normal incidence, which is given by $$R = \frac{(n-1)^2}{(n+1)^2},$$

where R is the reflectance at normal incidence and n is the refractive index of the material.

Typically, transflective surfaces are smooth partial reflectors or structured surfaces. However, in some embodiments, the inner transflective surface may have a textured surface(s), or at least a portion may have textured surface(s). The texturing may be random, or have a regular symmetric orientation. Typically, the texturing facilitates homogeneous, uniform lighting or otherwise provides light dispersion effect(s). Transflective surfaces can be provided, for example, as separate piece (e.g., a piece of plastic or the like) or a film. The transflective surfaces can also be provided, for example, by any of a number of techniques, including molding, sand blasting, bead blasting, chemical etching, embossing, and laser ablating, as well as other forming techniques that may be apparent to one skilled in the art after reading the instant disclosure.

Smooth partial reflectors are a type of transflective surface that gain their functionality by modifying the reflective properties of a surface without substantially changing the local geometry. For example, a surface is obtained by sputtering a small amount of metal (e.g., aluminum) onto a surface. As the thickness of the metal layer increases, the reflectivity changes from that calculated by the Fresnel equations up toward the theoretical maximum reflectance of the metal. Between these extremes lies the region of partial reflection.

Examples of smooth partial reflectors include metal/dielectric stacks such as silver (available, for example, from Alanod Westlake Metal Ind., North Ridgeville, Ohio, under the trade designation "MIRO-SILVER") and indium tin oxide (available, for example, from Techplast Coated Products, Inc., Baldwin, N.Y.), polarizing and non-polarizing multilayer optical films (available, for example, from 3M Company, St. Paul, Minn., under the trade designation "VIKUITI DUAL BRIGHTNESS ENHANCEMENT FILM"), polarizing and non-polarizing polymer blends (available, for example, from 3M Company under the trade designation "VIKUITI DIFFUSE REFLECTIVE POLARIZER FILM"), wire grid polarizers (available, for example, from Moxtek, Inc., Orem, Utah), and asymmetric optical films (see, e.g., U.S. Pat. No. 6,924,014 (Ouderkirk et al.) and U.S. Patent Application Ser. No. 60/939,084, filed May 20, 2007 (Attorney Docket No. 63031US002), and PCT Patent Application No. US2008/064133, the disclosures of which are incorporated herein by reference). Also useful as partial reflectors are perforated partial reflectors or mirrors (e.g., perforating specularly reflective films having an on-axis average reflectivity of at least 98% of any polarization such as described above (e.g., that marketed by 3M Company under the trade designation "VIKUITI ENHANCED SPECULAR REFLECTOR FILM"). Partial reflectors may also be, for example, mirrors or partial mirrors having a pattern of light scattering areas printed thereon. Crossed polarizers can be used as partial reflectors; the angle of crossing can be used to adjust the ratio of transmission to reflection. Also, foams, voided structures, or polymers filled with inorganic particulates such as titanium dioxide ($TiO_2$) can be used.

Optionally, light extraction features can be present on the back reflector so as to preferentially extract light from the hollow cavity over certain regions to redirect some of this guided light out of the light guide toward the output area of the backlight. Features can be uniformly spaced or non-uniformly spaced. For example, the inner surface of the reflector includes a first region with a first group of light extraction features and a second region with a second, different group of light extraction features. Optionally, the inner surface of the reflector includes a repeating pattern of light extraction features.

Gradient extraction can be accomplished by any element that increases or decreases locally the amount of light extraction. Since the inner reflector generally has some degree of angularly selective transmission, an extraction element that deviates additional light into the angular range of higher transmission will increase the brightness in that region. The extraction zone is generally toward normal, but can be designed to be at oblique angles. The material that is used for the extraction element can be specular, semispecular or diffuse, translucent, transflective, refractive, diffractive. Refractive elements can be prisms, lenslets, lenticulars, and the like. Extraction elements may be applied by printing, casting, etching, transfer (for example adhesive backed dots), lamination, etc. Extraction elements can be made by local deviations in a reflective surface such as embossing, peening, corrugating, abrading, or etching.

Achieving a desired gradient can be accomplished, for example, by changing the light re-directing properties of a diffusing coating locally or gradually across the surface area. This could be accomplished with, for example, a change in thickness, composition, or surface properties. Perforations would be another option, for example, a diffusing film having a gradient of perforations placed over the back reflector.

The gradient can be smoothly varying in a monotonic fashion. It can be abrupt such as in the case of one circular patch of diffuse reflector on a specular backplane to make a bright center.

Structured transflective surfaces have a plurality of minute structures arranged to reflect a substantial portion of the incident light and transmit a substantial portion. The reflectivity of the surface is changed primarily by this change in the local geometry. Useful structures include linear prisms, pyramidal prisms with triangular, square, hexagonal or other polygonal bases, cones, and ellipsoids, which structures may be in the form of projections extending out from a surface or pits extending into the surface. The size, shape, geometry, orientation, and spacing of the structures, as well as the use of multiple, different structures (e.g., different sizes, shapes, geometries, orientations, etc.), and density of spacing can all selected to optimize the performance of the light assembly or otherwise provide a desired effect. The individual structures can be symmetric and/or asymmetric. The structured surface can be uniform and/or non-uniform, and in the latter case both the position and size of the structures can be random or pseudo-random. In this context, "uniform" is understood to mean that the structured surface includes a repeating structural pattern. Disrupting regular features by periodic or pseudo-random variation of size, shape, geometry, orientation, and/or spacing may be used to adjust the color and/or brightness uniformity of the light assembly. In some cases it may be beneficial to have a distribution of small and large structures and position the transflective surface such that the smaller structures are aligned generally over the light sources and the larger structures are positioned elsewhere. In some embodiments, the structures can be closely packed such that there is minimal land (including arrangements in which there is substantially no land) between structures. In some embodiments, it may be desirable to control the land area to modulate the amount of light passing through the transflective surface.

The height to base length ratio of the structures is of some importance to the performance of the light assembly. A structure's base is the surface that would exist if none of the added shapes were present, and its base length is the greatest dimension from any point on the perimeter of the base to any other. Height is understood to mean the distance from the base of the structure to the point most distant from the base.

In a preferred embodiment, the structures are about 0.25 mm high, and about 30% of the transflective area is flat.

Typically, the structures range in height from about from 0.01 mm to 3 mm (in some embodiments, about 0.05 mm to about 0.5 mm), although other sizes are also useful.

In some embodiments, the transflective surface has a structure comprised of a plurality of shapes having a height to base length ratio greater than 0.6:1, 0.75:1, 0.8:1, 0.9:1, or even 1:1.

Examples of suitable structured transflective surfaces include commercial one-dimensional (linear) prismatic polymeric films such as available from 3M Company, St. Paul, Minn., under the trade designations "VIKUITI BRIGHTNESS ENHANCEMENT FILM," "VIKUITI TRANSMISSIVE RIGHT ANGLE FILM," VIKUITI IMAGE DIRECTING FILM," and "VIKUITI OPTICAL LIGHTING FILM," well as conventional lenticular linear lens arrays. When these one-dimensional prismatic films are used as transflective surfaces in a light assembly described herein, it is typically desirable for the prismatic structured surface to face the light source.

Additional examples of suitable structured transflective surfaces, where the structured surface has a two-dimensional character, include cube corner surface configurations such as those reported in U.S. Pat. No. 4,588,258 (Hoopman), U.S. Pat. No. 4,775,219 (Appeldorn et al.), U.S. Pat. No. 5,138,488 (Szczech), U.S. Pat. No. 5,122,902 (Benson), U.S. Pat. No. 5,450,285 (Smith et al.), and U.S. Pat. No. 5,840,405 (Shusta et al.); inverted prism surface configurations such as reported in U.S. Pat. No. 6,287,670 (Benson et al.) and U.S. Pat. No. 6,280,822 (Smith et al.); structured surface films such as reported in U.S. Pat. No. 6,752,505 (Parker et al.) and U.S. Patent Publication No. 2005/0024754 (Epstein et al.); and beaded sheeting such as that reported in U.S. Pat. No. 6,771,335 (Kimura et al.), the disclosures of which are incorporated herein by reference.

In some embodiments of the first and second light assemblies described herein, at least 50, 55, 60, 65, 70, 75, 80, 85, 90, 95, 99, or even 100 percent by area of the inner major surface of the reflector is transflective. The non-transflective area may be reflective or absorptive, for example, for aesthetic, cosmetic, or functional reasons.

Figure 8:
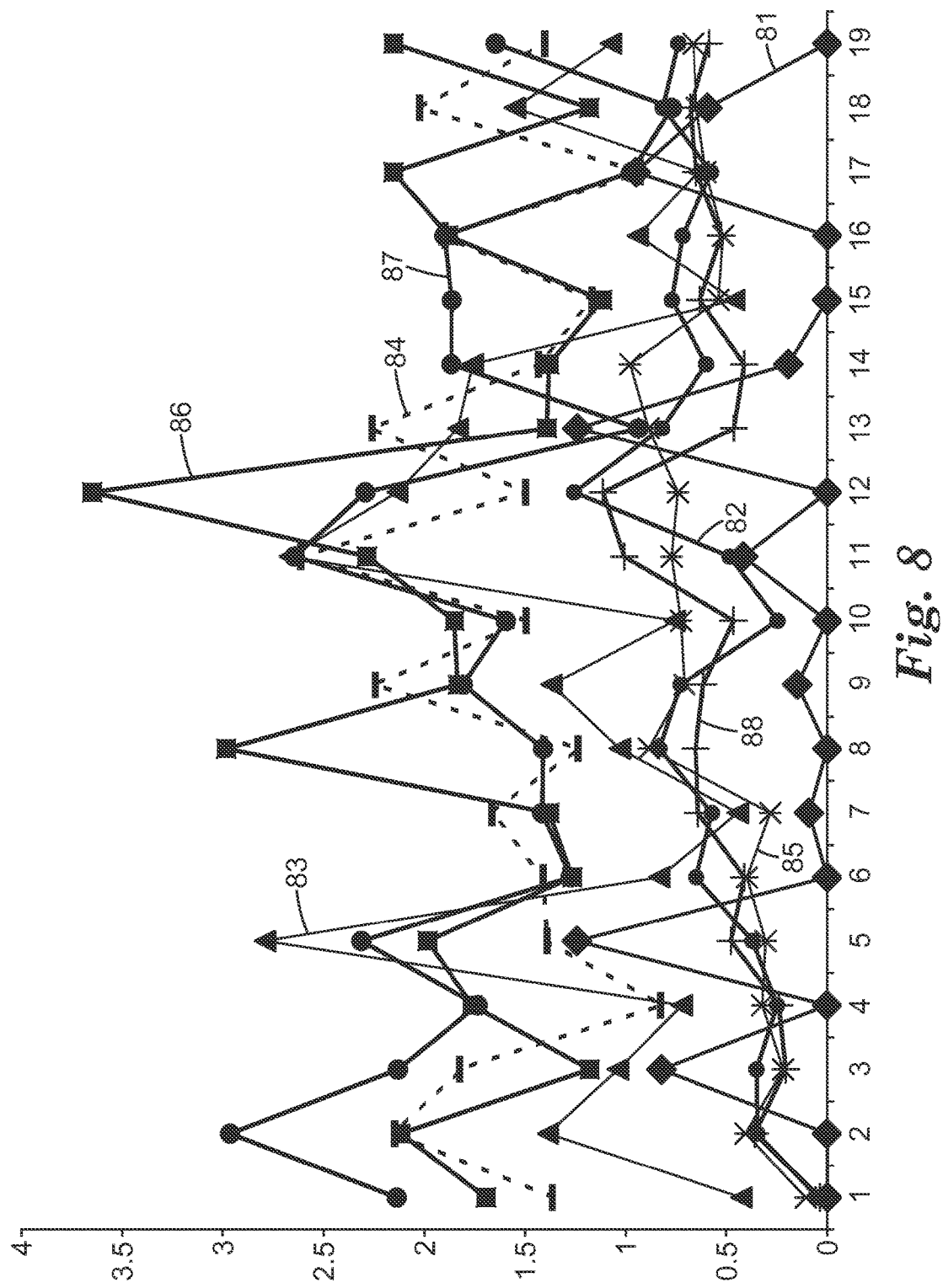
FIG. 8 is a plot of the calculated intensity at the 19 points specified by SAE J585 for several different structure shapes of an exemplary transflective surface.

FIG. 8 shows several traces representing different geometries of structure shapes. It is a plot of the calculated intensity at each of the points mentioned in the SAE J585 standard. The correlation between the number of the point and the angular specification in the standard is given in Table 1, below

TABLE 1

| Point # | H | V |
|---|---|---|
| 1 | 0 | 0 |
| 2 | −5 | 0 |
| 3 | 5 | 0 |
| 4 | 0 | −5 |
| 5 | 0 | 5 |
| 6 | −10 | 0 |
| 7 | −10 | −5 |
| 8 | −10 | 5 |
| 9 | 10 | 0 |
| 10 | 10 | −5 |
| 11 | 10 | 5 |
| 12 | −5 | −10 |
| 13 | −20 | −5 |
| 14 | −20 | 5 |
| 15 | −5 | 10 |
| 16 | 5 | −10 |
| 17 | 20 | −5 |
| 18 | 20 | 5 |
| 19 | 5 | 10 |

The traces in the plot of FIG. 8 correspond to the following structures: FullCC20$k$ 81 is a close-packed array of corner cubes; HexPyrh1 82 is a pyramid with a hexagonal base and a height to base length ratio of 0.5:1; HexPyrh2 83 is a pyramid with a hexagonal base and a height to base length ratio of 1:1; HexPyrh3 84 is a pyramid with a hexagonal base and a height to base length ratio of 1.5:1; Cone2$h$1 85 is a right circular cone with a height to base length ratio of 0.5:1; Cone2$h$2 86 is a right circular cone with a height to base length ratio of 1:1; Pyr2$h$1 88 is a pyramid with a square base and a height to base length ratio of 0.5:1; and Pyr2$h$2 87 is a pyramid with a square base and a height to base length ratio of 1:1.

The ordinate (y-value) of the plot shows the calculated intensity at each point as a fraction of the intensity of the light assembly with no structure. Although such a construction would not be practical, in the sense that it would not provide a uniform lit appearance, it does serve as a reasonable basis for comparison. All values that fall below one represent a decrease in intensity versus the basis, while values greater than one represent an intensity greater than the bases.

Although there is statistical "noise" in the data due to insufficient sampling, it is clear that the cube corners and the other structures with an aspect ratio of 0.5:1 are inferior to the basis in terms of intensity. Because the inner lens is preferably constructed of a material that absorbs little light at the design wavelengths (though it may absorb at other wavelengths), the reduced intensity means that the light is being directed away from the detector positions specified by the standard. Two possibilities for this redirection are that the light is reflected back into the optical cavity (the volume between the transflective surface and the reflector) or the light is transmitted by the transflective surface into directions other than toward the specified detector positions. Both possibilities will, in general, be realized, with the ratio between reflection and transmission being determined by the exact shape of the structure. For some applications, this redirection may be desirable, such as for widening the angular range over which the light is easily visible, while for other applications, it may be undesirable. Vehicular lighting places an emphasis on the intensity of light directed toward the locations of the specified detectors, so height to base length ratios of greater than 0.6 are preferred.

At the other end of the range of height to base length range, the intensity at the specified detector positions by HexPyrh3 74, with a height to base length ratio of 1.5:1 is not substantially greater than that produced by any of the shapes with an aspect ratio of 1:1. However, for most points, it does still exceed the basis for comparison, so it is within the preferred range of height to base length ratios. Increasing the height to base length ratio beyond some point, (e.g., 3:1), results in increasing difficulty of manufacture, so ratios beyond this may be impractical.

Figure 9:
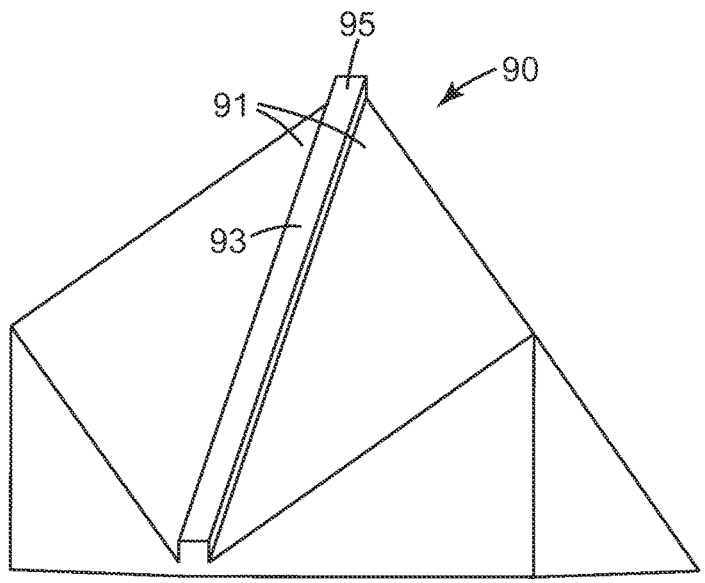
FIG. 9 is a perspective view of an exemplary structure in an exemplary transflective surface.

Another aspect of the structures relating to manufacturing is the possible inclusion of a (raised) rib from the base to the apex (see, e.g., FIG. 9, showing structure 90 having face 91 and (raised) rib 93 and apex 95), or point farthest from the base. This (raised) rib may be of any shape, but should affect only a small fraction of the surface of the shape, for example, up to 10% of the area (in some embodiments, up to 5%). The function of the (raised) rib is to avoid air entrapment in the molding process and to facilitate separation of the part from the mold.

In some embodiments, the transflective surface is at least partially (e.g., at least 10%, 15%, 20%, 25%, 30%, 35%, 40%, 45%, 50%, 55%, 60%, 65%, 70%, 75%, 80%, 85%, 90%, 95%, 97%, 98%, 99%, or even 100%) reflective. The reflectance may be semi-specular. A "semi-specular" reflector provides a balance of specular and diffusive properties. Semi-specular reflective surfaces can be provided, for example, by (1) a partial transmitting specular reflector plus a high reflectance diffuse reflector; (2) a partial Lambertian diffuser covering a high reflectance specular reflector; (3) a forward scattering diffuser plus a high reflectance specular reflector; or (4) a corrugated high reflectance specular reflector. Additional details regarding semi-specular reflective materials can be found, for example, in PCT Application No. US2008/864115, the disclosure of which is incorporated herein by reference.

In some embodiments, it may be desirable for the transflective surface to also be retroreflective. This is understood to mean that, in addition to transmitting and reflecting light within the optical cavity, the transflective also reflects a substantial portion of light incident on it from outside the outer lens cover back in the general direction of the source of that light. Traditionally, this is done by using cube corners (tetrahedra with three right angles) for the shape of the microstructures. In some embodiments where high retroreflectivity is not desired, reduced retroreflectivity may be achieved by using cube corners with spaces between them, or between groups of them, or by modifying the angles to differ from 90°. Partial retroreflectivity can range from returning 10% of the incident light to, for example, 20%, 30%, 40%, 50%, 60%, 70%, 80%, or even at least 90%. Partial retroreflectivity can also be induced, for example, by physical openings in the retroreflective surface (e.g., holes, slots, perforations, etc.) or by otherwise destroying the retroreflective functionality (e.g., such as by filling the retroreflective structured surface with coatings or adhesive). A spatially variant structure could also be used. "Spatially variant structure" means that the size, spacing, shape or some other parameter of the structures is varied across the surface.

Suitable reflectors are known in the art. The reflective nature of the reflector is, for example, an inherent property of a substrate material (e.g., polished aluminum), a coating on a substrate material (e.g., silver or a multilayer optical coating), or a reflective film attached to the substrate. Typically, it is desirable for the reflector to have a highly reflective surface for enhanced light output efficiency for the light assembly. Typically, the reflectivity of the reflective surface of the reflector for visible light is at least 90% (in some embodiments, at least 91%, 92%, 93%, 94%, 95%, 96%, 97%, 98%, 99%, or more). The reflector can be a predominantly specular, diffuse, or combination specular/diffuse reflector, whether spatially uniform or patterned. In some embodiments, the reflector is at least partially (e.g., at least 10%, 15%, 20%, 25%, 30%, 35%, 40%, 45%, 50%, 55%, 60%, 65%, 70%, 75%, 80%, 85%, 90%, 95%, or even 100%) semi-specularly reflective.

Suitable reflective films include those available from 3M Company, St. Paul, Minn., under the trade designations "VIKUITI ENHANCED SPECULAR REFLECTOR." Another exemplary reflective film made by laminating a barium sulfate-loaded polyethylene terephthalate film (0.08 mm (2 mils) thick) to a film available from 3M Company under the trade designation "VIKUITI ENHANCED SPECULAR REFLECTOR" using a 0.16 mm (0.4 mil) thick isooctylacrylate acrylic acid pressure sensitive adhesive. Other suitable reflective films include those available from Toray Industries, Inc., Urayasu, Japan, under the trade designation "E-60 SERIES LUMIRROR"; porous polytetrafluoroethylene (PTFE) films from W. L. Gore & Associates, Inc., Newark, Del.; those available from Labsphere, Inc., North Sutton, N.H., under the trade designation "SPECTRALON REFLECTANCE MATERIAL"; those available from Alanod Aluminum-Veredlung GmbH & Co., Ennepetal, Germany, under the trade designation "MIRO ANODIZED ALUMINUM FILMS" (including that available under the trade designation "MIRO 2 FILM"); those available from Furukawa Electric Co., Ltd., Tokyo, Japan, under the trade designation "MCPET HIGH REFLECTIVITY FOAMED SHEETING"; and those available from Mitsui Chemicals, Inc., Tokyo, Japan, under the trade designations "WHITE REFSTAR FILMS" and "MT FILMS."

The reflector may be substantially smooth, or it may have a structured surface associated with it to enhance light scattering or mixing. Such a structured surface can be imparted (a) on the reflective surface of the reflector, or (b) on a transparent coating applied to the reflective surface. In the former case, a highly reflecting film may be laminated to a substrate in which a structured surface was previously formed, or a highly reflecting film may be laminated to a flat substrate (e.g., \that available from 3M Company under the trade designation "VIKUITI DURABLE ENHANCED SPECULAR REFLECTOR-METAL (DESR-M) REFLECTOR") followed by forming the structured surface, such as with a stamping operation. In the latter case, a transparent film having a structured surface can be laminated to a flat reflective surface, or a transparent film can be applied to the reflector and then afterwards a structured surface imparted to the top of the transparent film.

The reflector can also be made substantially from reflective films such as that available from 3M Company under the trade designations "VIKUITI ENHANCED SPECULAR REFLECTOR." The latter film is thermoformable and has enhanced UV stability believed to be due to the presence of polymethylmethacrylate skins which encapsulate the multilayer polymer film structure that exhibits high specular reflectivity. This film can be used to thermoform reflector shapes suitable for a light assembly. This polymer film can be used, for example, as an insert in a pre-formed housing or as a stand alone housing component.

Alternatively, for example, the construction can be modified so that one of the skins is made from a different polymer that offers improved mechanical strength as compared to polymethylmethacrylate. For example, polycarbonate or a polymer blend of acrylonitrile butadiene styrene/polycarbonate can be used to form the second skin. The second skin need not to be transparent. This film can then be thermoformed into the desired reflector shape, oriented with the reflective surface facing the interior of the light assembly and the second skin serving as an external surface. This thermoformed part can be used a stand alone housing component.

The reflector can be a continuous unitary (and unbroken) layer on which the light source is mounted, or it can be constructed discontinuously in separate pieces, or discontinuously insofar as it includes isolated apertures, through which the light source can protrude, in an otherwise continuous layer. For example, strips of reflective material can be applied to a substrate on which rows of LED's are mounted, each strip having a width sufficient to extend from one row of LED's to another and having a length dimension sufficient to span between opposed borders of the backlight's output area.

Optionally, the reflector may comprise areas of differing reflectivity. For example, the reflector could have high reflectivity for all wavelengths near the light source, but reflect primarily one color, such as red, green or blue, far from the source (e.g., a multicolored light assembly with only one light source). The transition between the regions of differing reflectivity could also be gradual.

The reflector can also include sides and ends located along the outer boundary of the reflector that are preferably lined or otherwise provided with high reflectivity vertical walls to reduce light loss and improve recycling efficiency. The same reflective material used for the reflective surface can be used to form these walls, or a different reflective material can be used. In exemplary embodiments, the side walls are specularly reflective.

In some embodiments, the inner major surface of the reflector is substantially parallel to at least 40, 45, 50, 55, 60, 65, 70, 75, 80, 85 or even at least 90 percent of the inner major surface of the curved outer light cover.

In some embodiments, it may be desirable for light to be transmitted from both sides of the light assembly. For example, at least a portion (e.g., at least 1%, 2%, 5%, 10%, 20%, 50%, 75%, or even at least 90%) of the reflector can comprise a transflective surface as described above.

Exemplary light sources include light sources known in that art such as incandescent lights, light emitting diodes ("LEDs"), and arc lamps. They may have any desired output pattern, and may emit a desired color or act as a broadband source which is later filtered. Light assemblies described herein may have 1 or more (e.g., 2, 3, 4, 5, 6, 7, 8, 9, or more) light sources (e.g., 1, 2, 3, 4, 5, etc. incandescent lights, halogen lights, and or LEDs, etc.).

The light source(s) can be position to introduce through a hole or window in the reflector wall, be within, or partially within the optical cavity, including any side wall(s).

In some embodiments, the LED may be used with a wedge-shaped reflector so that light may be emitted into the enclosure with a restricted or partially collimated angular distribution. Further, in some embodiments, light sources that at least partially collimate the emitted light may be preferred. Such light sources can include lenses, extractors, shaped encapsulants, or combinations thereof of optical elements to provide a desired output into the enclosure. Further, the lighting output sources can include injection optics that partially collimate or confine light initially injected into the enclosure to propagate in directions close to a transverse plane (the transverse plane being parallel to the output area of the lighting output source) (e.g., an injection beam having an average deviation angle from the transverse plane in a range from 0° to 45°, or 0° to 30°, or even 0° to 15°).

Optionally, the light source includes a light guide (e.g., light fiber) at least partial within the cavity, the light fiber comprising a core and a clad having a refractive index lower than that of the core on the periphery of the core, wherein the light fiber has a light diffusive and reflective portion formed by co-extrusion at least on the inner periphery of the clad. Optionally, the diffusive and reflective portion comes into contact with the core. Optionally the light diffusive and reflective portion has a thickness extending at least to the vicinity of outer periphery of the clad in a direction perpendicular to the longitudinal direction from the clad. Optionally, the light diffusive and reflective portion is formed in a predetermined thickness extending from the inner periphery surface of the clad to the core portion in a direction perpendicular to the longitudinal direction of the clad. Optionally, the light diffusive and reflective portion extends into within the core. Optionally, the diffusive and reflective portion is formed a linear shape or a band-like shape along the longitudinal direction of the clad.

Optionally, the light fiber can be of a single material (light guide) and can incorporate light extraction structures (optical elements) that extract the light. In order to maintain a substantially uniform output illumination along the light emitting region of the fiber, the morphology, pattern and spacing of successive optical elements may be controlled so as to compensate for the light reflected out of the fiber by preceding elements. For example, the cross-sectional area of the reflecting surface(s) of successive optical elements may be increased in the direction of intended light travel. Alternatively, the spacing between successive optical elements may be decreased or the angle of the reflecting surface(s) changed, or a combination of any or all of these methods may be used.

In order to provide more light in broader angles one can incorporate more than one row (axis) of optical elements. It will be apparent to one of ordinary skill in the art that the minimum angular displacement δ is slightly greater than 0°, in which case the axes are nearly coincident, and the maximum angular displacement δ is 180°. In practice, the displacement δ between first longitudinal axis 20 and second longitudinal axis 22 is governed primarily by functional considerations. More particularly, the angular displacement δ is determined by the desired angular spread of the divergence cone of reflected light in the lateral (e.g., cross-fiber) dimension and may be determined using optical modeling techniques known to one of ordinary skill in the art. For many applications where the optical fiber is used to illuminate a broad area, angular displacements of up to 100° are useful to spread the emerging light into a broad angular distribution. By contrast, in applications where the optical fiber is viewed directly such as, for example, a vehicle warning light, it may be desirable to narrow the lateral dimension of the angular distribution of emerging light to concentrate the light within a desired angular range. For such applications, angular displacements δ between about 5° and 20° are useful.

Another benefit associated with disposing optical elements about distinct longitudinal axes extending along the surface of an optical fiber relates to shadowing effects in the fiber. Shadowing effects are discussed at length below. In brief, each optical element in an optical fiber shadows the adjacent optical element from a portion of the light rays propagating through an optical fiber. The degree of shadowing is proportional to the depth to which the optical element extends into the optic al fiber. Providing optical elements disposed about two distinct longitudinal axes on the surface of an optical fiber reduces detrimental effects associated with shadowing by allowing light to be spread into a broader divergence cone without resorting to deeper optical elements as required in single axis embodiments. Additionally, because the optical elements are displaced from one another, shadowing effects are spread more evenly around the perimeter of the optical fiber, making their effects less noticeable.

In some embodiments, it is desired to produce an illumination pattern in the x-z plane that is relatively narrowly confined in the vertical (y) direction but which provides roughly uniform intensity in the horizontal (x) direction. For example, it may be desirable for the intensity of the light in the horizontal direction to be roughly uniform over +/−45 degrees. An illumination device having a series of uniformly configured light extraction structures (optical elements) will not yield such an intensity pattern. However, a variety of different intensity patterns may be produced by providing a series of light extraction structures that have different configurations. For example, by providing a plurality of light extraction structures having several different notch angles the intensity pattern can be tailored for a given application. That is, the notch angle can become an adjustable parameter that can be varied to produce desired illumination patterns. For additional details on light fibers, see U.S. Pat. No. 6,563,993 (Imamura et al.).

In some embodiments, the light source(s) is placed through holes in the reflector. For example, they may be placed through the portion of the reflector which is substantially parallel to the inner surface of the outer cover, through the sides or ends of the through the portion of the reflector where the separation between the reflector and the outer light cover is decreasing.

In some embodiments, at least 10% (in some embodiments, at least 15%, 20%, 25%, 30%, 35%, 40%, 45%, 50%, 55%, 60%, 65%, 70%, 75%, 80%, 85%, or even at least 90%) of the outer major surface of the curved outer light cover is retroreflective.

Suitable light emitting diodes are known in the art, and commercially available, including LEDS having a light extraction cone in a range from 20° to 30° and LEDs having Lambertian light emission pattern. LEDs are available in a variety of power usage ratings, including those ranging from less than 0.1 to 10 watts (e.g., power usage ratings up to 0.1, 0.25, 0.5, 0.75, 1, 2.5, 5, or even up to 10 watts) per LED. LEDs are available, for example, in colors ranging range from ultraviolet (less than about 400 nm) to infrared (beyond 700 nm). Basic colors of LEDs are blue, green, red and amber, although other colors, as well, as white, are obtainable by mixing the basic colors or adding phosphors.

In some embodiments, and typically desirably, the light emitting diodes, when energized have a uniform luminous exitance. Luminous exitance refers to the amount of light emitted, in lumens, per unit area. The degree of required uniformity varies with the application. LCD's generally require uniformity to be greater than 80%, as specified in VESA-2001-6. Other applications, such as signs and vehicle lights do not have as clear a definition of uniformity, but the total change from the brightest point to the dimmest should not be noticeable, nor should there be any localized gradients in luminous exitance so great as to be obvious. In some embodiments, light assemblies described herein have up to 5 light emitting diodes per 100 $cm^2$.

In some embodiments, lighting assemblies described herein have a total power usage of up to 15 watts, 10 watts, or even up to 5 watts.

In some embodiments, light assemblies described herein have a length to depth ratio greater than 2:1, 3:1, 5:1, 10:1, 15:1, 20:1, 25:1, 50:1, 75:1, or even 80:1.

In some embodiments (e.g., vehicle components), it is desirable to for the light assembly (e.g., the optical cavity) to be sealed, for example, against dust and/or moisture penetration.

Figure 10:
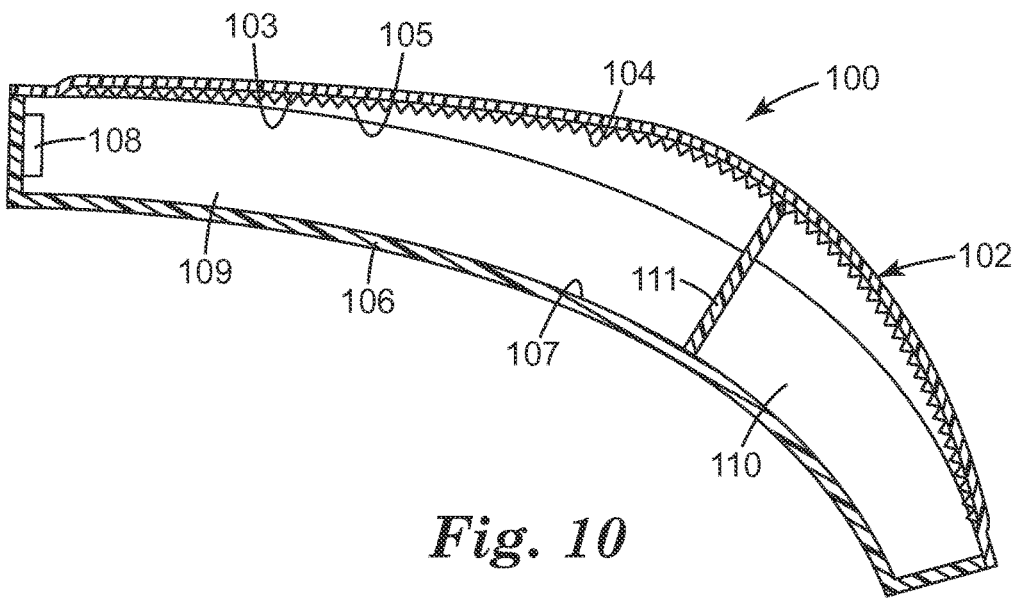
FIG. 10 is a perspective cross-sectional view of another exemplary embodiment of a light assembly of the present disclosure.

Optionally, lighting assembly described herein further comprising a tinted transmissive element(s) (e.g., a film(s)) (i.e., at least 20% (optionally, at least 25%, 30%, 35%, 40%, 45%, 50%, 55%, 60%, 70%, 75%, 80%, 85%, or even at least 90%) of the photons for at least one wavelength in the of light (e.g., in the visible spectrum) striking the element are transmitted through and exit the element) disposed between the transflective surface and the reflector. The transparent tinted element can be, for example, between inner major surface of the curved outer light and the reflector, between the first light and the inner major surface of the curved outer light, and/or between the first light source and the reflector. In some embodiments, a transparent tinted element can be positioned in the optical cavity to provide a first zone of a first color, and a second zone of a second, different color. For example, referring to FIG. 10, another exemplary light assembly of the present disclosure is shown. Light assembly 100 has curved outer light cover 102, reflector 106 having inner major surface 107, light emitting diode 108, transparent tinted element 111, and zones 109, 110. Film 104 having major transflective surface 105 is attached to inner major surface 103 of outer light cover 102.

One or more colors of transparent tined elements may be used. Suitable films are known in the art and include tinted (e.g., dyed or pigmented) films and color shifting films. Transmissive tinted and color shifting films are available, for example, from 3M Company under the trade designation "SCOTCHCAL 3630" in about 60 different colors.

"Color shifting film" as used herein refers to a film comprising alternating layers of at least a first and second layer type, wherein the first layer type comprises a strain hardening polymer (e.g., a polyester), wherein the film has at least one transmission band and one reflection band in the visible region of the spectrum, the transmission band having an average transmission of at least 70%, and wherein at least one of said transmission band and reflection band varies at normal incidence by less than about 25 nm over a square inch. Optionally, the film comprises alternating polymeric layers of at least a first and a second layer type, wherein the film has at least one transmission band and at least one reflection band in the visible region of the spectrum, and wherein at least one of the transmission band and reflection band has a band edge that varies at normal incidence by no more than 8 nm over a distance of at least 2 inches along each of two orthogonal axes in the plane of the film. Optionally, at least one of the transmission band and the reflection band has a bandwidth at normal incidence that varies by no more than 2 nm over a surface area of at least 10 $cm^2$. Optionally, the film has exactly one transmission band in the visible region of the spectrum. Optionally, the film has exactly one reflection band in the visible region of the spectrum. Color shifting films can be made, for example, as described in U.S. Pat. No. 6,531,230 (Weber et al.), the disclosure of which is incorporate herein by reference; additional details regarding such films can also be found in said patent.

In some embodiments, a semi-specular element can be disposed in the cavity (e.g., between inner major surface of the curved outer light and the reflector, between the first light and the inner major surface of the curved outer light, and/or between the first light source and the reflector (i.e., similar to the transparent tinted element described above with respect to FIG. 10)).

Optionally, light assemblies described herein can include a light sensor(s) and feedback system to detect and control, for example, brightness and/or color of light from the light source(s). For example, a sensor can be located near the light source(s) to monitor output and provide feedback to control, maintain, and/or adjust brightness and/or color. It may be beneficial, for example, to locate a sensor(s) along an edge and/or within the cavity to sample the mixed light. In some instances it may be beneficial, for example, to provide a sensor(s) to detect ambient light in the viewing environment (e.g., the room that the display is in or for an automotive taillight) whether it is day or night. Control logic can be used, for example, to appropriately adjust the output of the light source(s) based on ambient viewing conditions. Suitable sensor (s) are known in the art (e.g., light-to-frequency or light-to-voltage sensors), and are commercially available, for example, from Texas Advanced Optoelectronic Solutions, Plano, Tex.). Additionally, or alternatively, a thermal sensor(s) may be used to monitor and control the output of the light source(s). These sensor techniques can be used, for example, to adjust light output based on operating conditions and compensation for component aging over time.

Optionally, light assemblies described herein further comprise additional support features (e.g., a rod or the like), including within a portion of the optical cavity.

Embodiments of light assemblies described herein are useful, for example, as signs, backlights, displays, task lighting, luminaire, and vehicle (e.g., cars, trucks, airplanes, etc.) components. Vehicle comprising light assemblies include those where the light assembly is a vehicle tail light assembly.

EXEMPLARY EMBODIMENTS

1. An article comprising:
a transflective surface, at least a portion of which is curved; and
a reflector having a major surface that is substantially parallel to at least 30 percent by area of the curved portion of the transflective surface.

2. The article of embodiment 1, wherein the transflective surface has aconvex curvature.

3. The article of either embodiment 1 or 2, wherein the reflector is at least partially specularly reflective.

4. The article of any preceding embodiment, wherein the reflector is at least partially semi-specularly reflective.

5. The article of any preceding embodiment, wherein the transflective surface is at least partially specularly reflective.

6. The article of any preceding embodiment, wherein the transflective surface is at least partially semi-specularly reflective.

7. The article of any preceding embodiment, wherein the major surface of the reflector is substantially parallel to at least 40 percent by area of the curved portion of the transflective surface.

8. The article of any of embodiments 1 to 6, wherein the major surface of the reflector is substantially parallel to at least 50 percent by area of the curved portion of the transflective surface.

9. The article of any of embodiments 1 to 6, wherein the major surface of the reflector is substantially parallel to at least 60 percent by area of the curved portion of the transflective surface.

10. The article of any of embodiments 1 to 6, wherein the major surface of the reflector is substantially parallel to at least 70 percent by area of the curved portion of the transflective surface.

11. The article of any of embodiments 1 to 6, wherein the major surface of the reflector is substantially parallel to at least 80 percent by area of the curved portion of the transflective surface.

12. The article of any preceding embodiment, wherein the inner major surface of the reflector has a reflectance of at least 90 percent.

13. The article of any of embodiments 1 to 11, wherein the inner major surface of the reflector has a reflectance of at least 98.5 percent.

14. The article of any preceding embodiment, wherein the transflective surface includes a first region with a first group of structures and a second region with a second, different group of structures.

15. The article of any preceding embodiment, wherein the transflective surface includes a repeating pattern of structures.

16. The article of any preceding embodiment, wherein the transflective surface has a structure comprised of a plurality of shapes having a height to base length ratio greater than 0.6:1.

17. The article of any of embodiments 1 to 15, wherein the transflective surface has a structure comprised of a plurality of shapes having a height to base length ratio greater than 0.75:1.

18. The light assembly of any of embodiments 1 to 15, wherein the transflective surface has a structure comprised of a plurality of shapes having a height to base length ratio greater than 0.9:1.

19. The light assembly of any of embodiments 17 to 18, wherein the shape of at least one of the structures has a surface area and on the transflective surface includes a rib from the base to the apex of the structure covering no more than 10% of the surface area of the structure.

20. The light assembly of any of embodiments 17 to 18, wherein the shape of at least one of the structures has a surface area and on the transflective surface includes a rib from the base to the apex of the structure covering no more than 5% of the surface area of the structure.

21. The article of any preceding embodiment, wherein the transflective surface is a film having a transflective surface.

22. The article of any of embodiments 1 to 21, wherein the transflective surface is embossed.

23. A light assembly comprising:
an outer light cover having an outer major surface;
a curved transflective surface;
a reflector having an inner major surface that is substantially parallel to at least 30 percent by area of the curved portion of the transflective surface, wherein the curved transflective surface is disposed between the outer major surface of the outer light cover and the inner major surface of the reflector; and
a first light source, wherein there is an optical cavity between the outer light cover and the reflector, and wherein the first light source is positioned to introduce light into the optical cavity.

24. The lighting assembly of embodiment 23, wherein the curved portion of the transflective surface and of the inner major surface of the reflector have a convex curvature.

25. The lighting assembly of any of either embodiment 23 or 24, wherein the outer light cover further comprises an inner major surface, and wherein at least 30 percent by area of the inner major surface of the outer light cover is the curved portion of the transflective surface.

26. The lighting assembly of any of either embodiment 23 or 24, wherein the outer light cover further comprises an inner major surface, and wherein at least 40 percent by area of the inner major surface of the outer light cover is the curved portion of the transflective surface 27. The lighting assembly of any of either embodiment 23 or 24, wherein the outer light cover further comprises an inner major surface, and wherein at least 50 percent by area of the inner major surface of the outer light cover is the curved portion of the transflective surface.

28. The lighting assembly of either embodiment 23 or 24, wherein the outer light cover further comprises an inner major surface, and wherein at least 60 percent by area of the inner major surface of the outer light cover is the curved portion of the transflective surface.

29. The lighting assembly of either embodiment 23 or 24, wherein the outer light cover further comprises an inner major surface, and wherein at least 70 percent by area of the inner major surface of the outer light cover is the curved portion of the transflective surface.

30. The lighting assembly of embodiment 23 or 24, wherein the outer light cover further comprises an inner major surface, and wherein at least 80 percent by area of the inner major surface of the outer light cover is the curved portion of the transflective surface.

31. The lighting assembly of embodiment 23 or 24, wherein the outer light cover further comprises an inner major surface, and wherein at least 85 percent by area of the inner major surface of the outer light cover is the curved portion of the transflective surface.

32. The lighting assembly of embodiment 23 or 24, wherein the outer light cover further comprises an inner major surface, and wherein at least 90 percent by area of the inner major surface of the outer light cover is the curved portion of the transflective surface.

33. The lighting assembly of embodiment 23 or 24, wherein the outer light cover further comprises an inner major surface, and wherein at least 99 percent by area of the inner major surface of the outer light cover is the curved portion of the transflective surface.

34. The lighting assembly of embodiment 23 or 24, wherein the outer light cover further comprises an inner major surface, and wherein 100 percent by area of the inner major surface of the outer light cover is the curved portion of the transflective surface.

35. The lighting assembly of any of embodiments 23 to 34, wherein the reflector is at least partially specularly reflective.

36. The lighting assembly of any of embodiments 23 to 35, wherein the reflector is at least partially semi-specularly reflective.

37. The lighting assembly of any of embodiments 23 to 36, wherein the curved transflective is at least partially specularly reflective.

38. The lighting assembly of any of embodiments 23 to 36, wherein the curved transflective surface of the outer light cover is at least partially semi-specularly reflective.

39. The lighting assembly of any of embodiments 23 to 38, wherein the inner major surface of the reflector is substantially parallel to at least 40 percent by area of the curved portion of the transflective surface.

40. The lighting assembly of any of embodiments 23 to 38, wherein the inner major surface of the reflector is substantially parallel to at least 50 percent by area of the curved portion of the transflective surface.

41. The lighting assembly of any of embodiments 23 to 38, wherein the inner major surface of the reflector is substantially parallel to at least 60 percent by area of the curved portion of the transflective surface.

42. The lighting assembly of any of embodiments 23 to 38, wherein the inner major surface of the reflector is substantially parallel to at least 70 percent by area of the curved portion of the transflective surface.

43. The lighting assembly of any of embodiments 23 to 38, wherein the inner major surface of the reflector is substantially parallel to at least 80 percent by area of the curved portion of the transflective surface.

44. The lighting assembly of any of embodiments 23 to 43, wherein the inner major surface of the reflector has a reflectance of at least 90 percent.

45. The lighting assembly of any of embodiments 23 to 43, wherein the inner major surface of the reflector has a reflectance of at least 98.5 percent.

46. The lighting assembly of any of embodiments 23 to 45, further comprising as diffuser disposed between the outer cover and the inner major surface of the reflector.

47. The lighting assembly of any of embodiments 23 to 46, wherein the inner surface of the reflector includes a first region with a first group of light extraction features and a second region with a second, different group of light extraction features.

48. The lighting assembly of any of embodiments 23 to 47, wherein the inner surface of the reflector includes a repeating pattern of light extraction features.

49. The lighting assembly of any of embodiments 23 to 48, wherein the transflective surface includes a first region with a first group of structures and a second region with a second, different group of structures.

50. The lighting assembly of any of embodiments 23 to 49, wherein the transflective surface includes a repeating pattern of structures.

51. The light assembly of any of embodiments 23 to 50 having a length to depth ratio greater than 2:1.

52. The light assembly of any of embodiments 23 to 51 having a length to depth ratio greater than 3:1.

53. The light assembly of any of embodiments 23 to 51 having a length to depth t ratio greater than 5:1.

54. The light assembly of any of embodiments 23 to 51 having a length to depth ratio greater than 10:1.

55. The light assembly of any of embodiments 23 to 51 having a length to depth ratio greater than 25:1.

56. The light assembly of any of embodiments 23 to 51 having a length to depth ratio greater than 50:1.

57. The light assembly of any of embodiments 23 to 51 having a length to depth ratio greater than 75:1.

58. The lighting assembly of any of embodiments 23 to 57, wherein the transflective surface has a structure comprised of a plurality of shapes having a height to base length ratio greater than 0.6:1.

59. The light assembly of any of embodiments 23 to 57, wherein the transflective surface has a structure comprised of a plurality of shapes having a height to base length ratio greater than 0.75:1.

60. The light assembly of any of embodiments 23 to 57, wherein the transflective surface has a structure comprised of a plurality of shapes having a height to base length ratio greater than 0.9:1.

61. The light assembly of any of embodiments 58 to 60, wherein the shape of at least one of the structures has a surface area and on the transflective surface includes a rib from the base to the apex of the structure covering no more than 10% of the surface area of the structure.

62. The light assembly of any of embodiments 58 to 60, wherein the shape of at least one of the structures has a surface area and on the transflective surface includes a rib from the base to the apex of the structure covering no more than 5% of the surface area of the structure.

63. The lighting assembly of any of embodiments 23 to 62, wherein the transflective surface is a film having a transflective surface.

64. The lighting assembly of any of embodiments 23 to 62, wherein the transflective surface is molded into inner surface of the outer light cover.

65. The lighting assembly of any of embodiments 23 to 62, wherein the transflective surface is embossed into inner surface of the outer light cover.

66. The lighting assembly of any of embodiments 23 to 65, wherein when the light source is energized, the light assembly exhibiting a uniform luminous exitance.

67. The lighting assembly of any of embodiments 24 to 66, wherein the light source is at least one light emitting diode.

68. The lighting assembly of embodiment 67, wherein the at least one light emitting diode has a power usage rating in a range from 0.25 watt to 5 watts.

69. The lighting assembly of embodiments 67 or 68, wherein the at least one light emitting diode has a Lambertian light emission pattern.

70. The lighting assembly of any embodiments 67 to 69 having two light emitting diodes.

71. The lighting assembly of any of embodiments 67 to 69 having three light emitting diodes.

72. The lighting assembly of any of embodiments 67 to 69 having four light emitting diodes.

73. The lighting assembly of any of embodiments 67 to 69 having five light emitting diodes.

74. The lighting assembly of any of embodiments 23 to 73 having up to 5 light emitting diodes per 100 cm$^2$.

75. The lighting assembly of any of embodiments 23 to 74, wherein the first light source includes a light guide positioned at least partially within the optical cavity.

76. The lighting assembly of any of embodiments 23 to 75, further comprising a transparent tinted element between inner major surface of the curved outer light and the reflector.

77. The lighting assembly of any of embodiments 23 to 76, further comprising a transparent tinted element between the first light and the inner major surface of the curved outer light.

78. The lighting assembly of any of embodiments 23 to 77, further comprising a transparent tinted element between the first light source and the reflector.

79. The lighting assembly of any of embodiments 23 to 78, wherein a transparent tinted element can be positioned in the optical cavity to provide a first zone of a first color, and a second zone of a second, different color.

80. The lighting assembly of any of embodiments 23 to 79, further comprising a semi-specular element disposed in the cavity.

81. The lighting assembly of any of embodiments 23 to 80, wherein the reflector is also transflective.

82. The lighting assembly of any of embodiments 23 to 81, wherein the curved outer light cover has an outer major surface that is at least 10% retroreflective.

83. The lighting assembly of any of embodiments 23 to 81, wherein the curved outer light cover has an outer major surface that is at least 25% retroreflective.

84. The lighting assembly of any of embodiments 23 to 81, wherein the curved outer light cover has an outer major surface that is at least 50% retroreflective.

85. The lighting assembly of any of embodiments 23 to 81, wherein the curved outer light cover has an outer major surface that is at least 75% retroreflective.

86. The lighting assembly of any of embodiments 23 to 81, wherein the curved outer light cover has an outer major surface that is at least 90% retroreflective.

87. The lighting assembly of any of embodiments 23 to 86, wherein the reflector comprises first and second areas of reflectivity, wherein the first area of reflectivity is more reflective with respect to a first wavelength of light than the second area of reflectivity, and wherein the second area of reflectivity is more reflective with respect to a second, different wavelength of light than the first area of reflectivity.

88. The lighting assembly of any of embodiments 24 to 87, wherein the transflective surface comprises first and second areas of transflectivity, wherein the first area of transflectivity is more transflective with respect to a first wavelength of light than the second area of transflectivity, and wherein the second area of transflectivity is more transflective with respect to a second, different wavelength of light than the first area of transflectivity.

89. The lighting assembly any of embodiments 23 to 88, further comprising wherein a light sensor.

90. The lighting assembly of any of embodiments 23 to 89, further comprising wherein a thermal sensor.

91. A sign comprising the light assembly of any of embodiments 23 to 90.

92. A backlight comprising the light assembly of any of embodiments 23 to 90.

93. A display comprising the light assembly of any of embodiments 23 to 90.

94. Task lighting comprising the light assembly of any of embodiments 23 to 90.

95. A luminaire comprising the light assembly of any of embodiments 23 to 90.

96. The light assembly of any of embodiments 23 to 90 which is a vehicle component.

97. The light assembly of any of embodiments 23 to 90 which is a vehicle tail light assembly.

98. A vehicle comprising the lighting assembly of any of embodiments 23 to 90.

99. A light assembly comprising
an outer light cover having an outer major surface;
a curved transflective surface;
a reflector having a curved inner major surface, wherein the curved transflective surface is disposed between the outer major surface of the outer light cover and the curved inner major surface of the reflector; and
a first light source,
wherein there is an optical cavity between the outer light cover and the reflector, and wherein the first light source is positioned to introduce light into the optical cavity, wherein the curved inner major surface of the reflector is oriented to the transflective surface so that the separation between the two surfaces decreases along a distance away from the light source, and wherein the maximum local ratio of decrease in separation to distance is less than 0.8:1.

100. The lighting assembly of embodiment 99, wherein the outer light cover further comprises an inner major surface that is the curved transflective surface 101. The lighting assembly of either embodiment 99 or 100, wherein the maximum local ratio of decrease in separation to distance is less than 0.7:1.

102. The lighting assembly of either embodiment 99 or 100, wherein the maximum local ratio of decrease in separation to distance is less than 0.6:1.

103. The lighting assembly of either embodiment 99 or 100, wherein the maximum local ratio of decrease in separation to distance is less than 0.5:1.

104. The lighting assembly of either embodiment 99 or 100, wherein the maximum local ratio of decrease in separation to distance is less than 0.4:10.

105. The lighting assembly of either embodiment 99 or 100, wherein the maximum local ratio of decrease in separation to distance is less than 0.35:1.

106. The lighting assembly either embodiment 99 or 100, wherein the maximum local ratio of decrease in separation to distance is less than 0.3:1.

107. The lighting assembly of either embodiment 99 or 100, wherein the maximum local ratio of decrease in separation to distance is less than 0.25:1.

108. The lighting assembly of either embodiment 99 or 100, wherein the maximum local ratio of decrease in separation to distance is less than 0.2:1.

109. The lighting assembly of either embodiment 99 or 100, wherein the maximum local ratio of decrease in separation to distance is less than 0.15:1.

110. The lighting assembly of either embodiment 99 or 100, wherein the maximum local ratio of decrease in separation to distance is less than 0.1:1.

111. The lighting assembly of either embodiment 99 or 100, wherein the maximum local ratio of decrease in separation to distance is less than 05:1.

112. The lighting assembly of either embodiment 99 or 100, wherein the inner major surface of the curved outer light cover has a convex curvature.

113. The lighting assembly of any of embodiments 99 to 112, wherein the outer light cover further comprises an inner major surface, and wherein at least 50 percent by area of the inner major surface of the outer light cover is transflective.

114. The lighting assembly of any of embodiments 99 to 112, wherein the outer light cover further comprises an inner major surface, and wherein at least 60 percent by area of the inner major surface of the outer light cover is transflective.

115. The lighting assembly of any of embodiment 99 to 112, wherein the outer light cover further comprises an inner major surface, and wherein at least 70 percent by area of the inner major surface of the outer light cover is transflective.

116. The lighting assembly of any of embodiments 99 to 112, wherein the outer light cover further comprises an inner major surface, and wherein at least 80 percent by area of the inner major surface of the outer light cover is transflective.

117. The lighting assembly of any of embodiments 99 to 112, wherein the outer light cover further comprises an inner major surface, and wherein at least 85 percent by area of the inner major surface of the outer light cover is transflective.

118. The lighting assembly of any of embodiments 99 to 112, wherein the outer light cover further comprises an inner major surface, and wherein at least 90 percent by area of the inner major surface of the outer light cover is transflective.

119. The lighting assembly of any of embodiments 99 to 112, wherein the outer light cover further comprises an inner major surface, and wherein at least 99 percent by area of the inner major surface of the outer light cover is transflective.

120. The lighting assembly of any of embodiments 99 to 112, wherein the outer light cover further comprises an inner major surface, and wherein 100 percent by area of the inner major surface of the outer light cover is transflective.

121. The lighting assembly of any of embodiments 99 to 120, wherein the reflector is at least partially specularly reflective.

122. The lighting assembly of any of embodiments 99 to 121, wherein the reflector is at least partially semi-specularly reflective.

123. The lighting assembly of any of embodiments 99 to 122, wherein the inner major surface of the outer light cover is at least partially specularly reflective.

124. The lighting assembly of any of embodiments 99 to 123, wherein the inner major surface of the outer light cover is at least partially semi-specularly reflective.

125. The lighting assembly of any of embodiments 99 to 124, wherein the major surface of the reflector has a reflectance of at least 90 percent.

126. The lighting assembly of any of embodiments 99 to 125, wherein the major surface of the reflector has a reflectance of at least 98.5 percent.

127. The lighting assembly of any of embodiments 99 to 126, further comprising as diffuser disposed between the outer curved outer cover and the inner major surface 128. The lighting assembly of any of embodiments 99 to 127, wherein the inner surface of the reflector includes a first region with a first group of light extraction features and a second region with a second, different group of light extraction features.

129. The lighting assembly of any of embodiments 99 to 128, wherein the inner surface of the reflector includes a repeating pattern of light extraction features.

130. The lighting assembly of any of embodiments 99 to 129, wherein the transflective surface includes a first region with a first group of structures and a second region with a second, different group of structures.

131. The lighting assembly of any of embodiments 99 to 130, wherein the transflective surface includes a repeating pattern of structures.

132. The light assembly of any of embodiments 99 to 131 having a length to depth to length ratio greater than 2:1.

133. The light assembly of any of embodiments 99 to 131 having a length to depth to length ratio greater than 3:1.

134. The light assembly of any of embodiments 99 to 131 having a length to depth to length ratio greater than 5:1.

135. The light assembly of any of embodiments 99 to 131 having a length to depth to length ratio greater than 10:1.

136. The light assembly of any of embodiments 99 to 131 having a length to depth to length ratio greater than 25:1.

137. The light assembly of any of embodiments 99 to 131 having a length to depth to length ratio greater than 50:1.

138. The light assembly of any of embodiments 99 to 131 having a length to depth to length ratio greater than 75:1.

139. The light assembly of any of embodiments 99 to 138, wherein the transflective surface has a structure comprised of a plurality of shapes having a height to base length ratio greater than 0.6:1.

140. The light assembly of any of embodiments 99 to 138, wherein the transflective surface has a structure comprised of a plurality of shapes having a height to base length ratio greater than 0.75:1.

141. The light assembly of any of embodiments 99 to 138, wherein the transflective surface has a structure comprised of a plurality of shapes having a height to base length ratio greater than 0.9:1.

142. The light assembly of any of embodiments 137 to 141, wherein the shape of at least one of the structures has a surface area and on the transflective surface includes a rib from the base to the apex of the structure covering up to 10% of the surface area of the structure.

143. The light assembly of any of embodiments 137 to 141, wherein the shape of at least one of the structures has a surface area and on the transflective surface includes a rib from the base to the apex of the structure covering up to 5% of the surface area of the structure.

144. The lighting assembly of any of embodiments 99 to 143, wherein the outer light cover comprises an outer part secured to an inner part, and wherein the inner part includes the transflective surface.

145. The lighting assembly of any of embodiments 99 to 144, wherein the transflective surface is a film having a transflective surface.

146. The lighting assembly of any of embodiments 99 to 144, wherein the transflective surface is molded into inner surface of the outer light cover.

147. The lighting assembly of any of embodiments 99 to 144, wherein the transflective surface is embossed into inner surface of the outer light cover.

148. The lighting assembly of any of embodiments 99 to 147, wherein when the light source is energized, the light assembly exhibiting a uniform luminous exitance.

149. The lighting assembly of any of embodiments 99 to 147, wherein the light source is at least one light emitting diode.

150. The lighting assembly of embodiment 149, wherein the at least one light emitting diode has a power usage rating in a range from 0.25 watt to 5 watts.

151. The lighting assembly of either embodiments 149 or 150, wherein the at least one light emitting diode has a Lambertian light emission pattern.

152. The lighting assembly of any of embodiments 150 or 151 having two light emitting diodes.

153. The lighting assembly of any of embodiments 150 or 151 having three light emitting diodes.

154. The lighting assembly of any of embodiments 150 or 151 having four light emitting diodes.

155. The lighting assembly of any of embodiments 150 or 151 having five light emitting diodes.

156. The lighting assembly of any of embodiments 99 to 155 having up to 5 light emitting diodes per 100 cm$^2$.

157. The lighting assembly of any of embodiments 99 to 156, further comprising a transparent tinted element between inner major surface of the curved outer light and the reflector.

158. The lighting assembly of any of embodiments 99 to 157, further comprising a transparent tinted element between the first light and the inner major surface of the curved outer light.

159. The lighting assembly of any of embodiments 99 to 158, further comprising a transparent tinted element between the first light source and the reflector.

160. The lighting assembly of any of embodiments 99 to 159, wherein a transparent tinted element can be positioned in the optical cavity to provide a first zone of a first color, and a second zone of a second, different color.

161. The lighting assembly of any of embodiments 99 to 160, further comprising a semi-specular element between the first light source and the reflector.

162. The lighting assembly of any of embodiments 99 to 161, wherein the reflector is also transflective.

163. The lighting assembly of any of embodiments 99 to 162, wherein the curved outer light cover has an outer major surface that is at least 10% retroreflective.

164. The lighting assembly of any of embodiments 99 to 162, wherein the curved outer light cover has an outer major surface that is at least 25% retroreflective.

165. The lighting assembly of any of embodiments 99 to 162, wherein the curved outer light cover has an outer major surface that is at least 50% retroreflective.

166. The lighting assembly of any of embodiments 99 to 162, wherein the curved outer light cover has an outer major surface that is at least 75% retroreflective.

167. The lighting assembly of any of embodiments 99 to 162, wherein the curved outer light cover has an outer major surface that is at least 90% retroreflective.

168. The lighting assembly of any of embodiments 99 to 167, wherein the reflector comprises first and second areas of reflectivity, wherein the first area of reflectivity is more reflective with respect to a first wavelength of light than the second area of reflectivity, and wherein the second area of reflectivity is more reflective with respect to a second, different wavelength of light than the first area of reflectivity.

169. The lighting assembly of any of embodiments 99 to 168, wherein the transflective surface comprises first and second areas of transflectivity, wherein the first area of transflectivity is more transflective with respect to a first wavelength of light than the second area of transflectivity, and wherein the second area of transflectivity is more transflective with respect to a second, different wavelength of light than the first area of transflectivity.

170. The lighting assembly of any of embodiments 99 to 169, further comprising wherein a light sensor.

171. The lighting assembly of embodiments 99 to 170, further comprising wherein a thermal sensor.

172. A sign comprising the light assembly of any of embodiments 99 to 171.

173. A backlight comprising the light assembly of any of embodiments 99 to 171.

174. A display comprising the light assembly of any of embodiments 99 to 171.

175. Task lighting comprising the light assembly of any of embodiments 99 to 171.

176. A luminaire comprising the light assembly of any of embodiments 99 to 171.

177. The light assembly of any of embodiments 99 to 171 which is a vehicle component.

178. The light assembly of any of embodiments 99 to 171 which is a vehicle tail light assembly.

179. A vehicle comprising the lighting assembly of any of embodiments 99 to 171.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLE 1

A microstructured, cube corner, polycarbonate film comprising preferred geometry (PG) cube corner elements was prepared using an extrusion process with tooling made from multigenerational replicas of PG cubes formed on laminae. Using an extrusion process to produce a microstructured film from a microstructured tool is known in the art and is generally described in U.S. Pat. No. 5,450,235 (Smith et al.) and U.S. Pat. No. 7,364,421 (Erickson et al.), the disclosures of which are incorporated herein by reference. The tooling used in this example is generally described in U.S. Pat. No. 7,329,012 (Smith), with detailed construction as follows. Forward canted cubes such as those shown in FIG. 11 of U.S. Pat. No. 7,329,012 (Smith) were used. The forward canted PG cubes were formed on laminae with a thickness of 0.173 mm (0.0068 inch). The spacing between the side grooves was 0.104 mm (0.00408 inch). The side groove included angle was nominally 90 degrees, and the grooves were oriented at nominally 45 degrees relative to the top surface (reference plane 26 of FIG. 3 of U.S. Pat. No. 7,329,012 (Smith)) of each lamina. Each side groove formed cube faces on two adjacent PG cube corners. The cube faces formed by the side grooves were nominally orthogonal (form a 90 degree angle) with the primary groove face. The primary groove face on each laminae was also oriented at nominally 45 degrees relative to the top surface (reference plane 26 of FIG. 3 of U.S. Pat. No. 7,329,012 (Smith)). The height of the cubes in the z-direction (as defined in U.S. Pat. No. 7,329,012 (Smith)) from the peak to the lowest point was 0.160 mm (0.00628 inch). Skew and inclination were used during the formation of the cubes on the laminae to introduce slight dihedral errors into the cubes in order to control retroreflective performance. The master mold was formed from a plurality of laminae where the cubes of adjacent laminae had opposing orientations. As described in U.S. Pat. No. 7,329,012 (Smith), multiple negative replicas of the original PG cube master mold were tiled together to form the final tool. These replicas were formed by electroplating the surface of the master mold to form negative copies, subsequently electroplating the negative copies to form positive copies, electroplating the positive copies to form a second generation negative copy, and continuing until enough replicas were made to assemble the tool.

The polycarbonate film was then modified to make a new tool by using photolithography to expose and develop a photoresist to form a hexagonal array on a piece of the microstructured, cube corner, polycarbonate film. Three layers of 0.05 mm (2 mil) thick (each) dry-film photoresist (obtained under the trade designation "MP520" from MacDermid, Waterbury, Conn.) were laminated to the structured side of the substrate. The liner for the first two layers was removed prior to laminating the subsequent layer. The resulting material was then flood exposed through a 35% open area, hexagonal patterned mask using a UV flood exposure system (obtained under the trade designation "COLIGHT" from Colight, Farfield, N.J.). The resulting material was then laminated to a stainless steel plate using a printing tape (obtained under the trade designation "FLEXMOUNT PRINTING TAPE" from 3M Company), and the photoresist was developed to expose the cube corner pattern in the open hexagonal areas. The patterned surface was then conventionally electroformed to make a flat Ni tool. The resultant tool (mold) pattern has a hexagonal edge length of 1.75 mm and a feature depth of about 0.12 mm. A transflective sheet was then made from a 1.5 mm (1/16 inch) thick clear polyethylene terephthalate co-polymer (PETG) sheet (obtained from McMaster-Carr, Chicago, Ill.). This sheet was embossed with the mold's structure by heating it to 150° C. (300° F.) and pressing it against a mold.

A light assembly was constructed as generally shown in FIGS. 1 and 1A having an outer cover, a separate, rigid transflective sheet, a curved reflector, and a light emitting diode mounted through a hole in the reflector. The light emitting diode was obtained under the trade designation "OSRAM DIAMOND DRAGON" (part number LA W5AP) from Osram Opto Semiconductors, Inc, Santa Clara, Calif., and was powered by a 1.5 A current limiting power supply. The outer cover was the outer lens from a 2008 Buick Enclave available from General Motors, Detroit, Mich.

After the structure was embossed on the PETG sheet, thermoforming equipment was used to create the gross geometry of the sheet. This gross geometry was such that at the periphery, the sheet made even contact with the mounting flange of the outer cover. Further, the inside of the periphery approximated a torus with radii of 180 mm and 300 mm. The form used in the thermoforming process was made using conventional stereolithography. The same process was used to make the substrate for the reflector. The reflector had sides and a back, with a thickness of 2 mm, joined with a blend radius of 3 mm. The sides joined the outer cover and the transflective sheet at the outer cover's flange, and extend back from this flange perpendicularly. The back of the reflector was a torus with the same radii as the transflective sheet, so that the distance between the two is constant everywhere except at the blend between the back of the reflector and its sides. The inner surface of the reflector substrate was covered with a reflective film (available from 3M Company under the trade designation "VIKUITI ENHANCED SPECULAR REFLECTOR FILM"), which is laminated to it using a pressure sensitive adhesive (available from 3M Company under the trade designation "3M ADHESIVE TRANSFER TAPE 9471LE").

The light emitting diode was mounted through the reflector substrate, with the light being admitted into the volume between the reflector and the transflective film through a 2 mm hole in the reflective film. The hole was located under the elliptical flat portion of the outer cover.

EXAMPLE 2

Example 2 was prepared as described for Example 1, except the light emitting diode was in a sidewall as shown in FIG. 3.

Foreseeable modifications and alterations of this invention will be apparent to those skilled in the art without departing from the scope and spirit of this invention. This invention should not be restricted to the embodiments that are set forth in this application for illustrative purposes.

What is claimed is:
1. A lighting assembly comprising:
 a transflective surface having a reflectivity greater than dictated by Fresnel equation at normal incidence:

$$R = \frac{(n-1)^2}{(n+1)^2},$$

where R is reflectance at normal incidence and n is a refractive index of the material;
 a reflector facing the transflective surface and defining an optical cavity between the transflective surface and the reflector; and a first light source positioned to introduce light into the optical cavity.

2. The lighting assembly of claim 1, wherein the transflective surface has higher transmission toward normal and lower transmission at oblique angles.

3. The lighting assembly of claim 1, wherein the transflective surface has higher transmission at oblique angles and lower transmission toward normal.

4. The lighting assembly of claim 1 further comprising an outer light cover, the transflective surface disposed between the outer light cover and the reflector.

5. The lighting assembly of claim 4, wherein the outer light cover defines another optical cavity between the outer light cover and the transflective surface.

6. The lighting assembly of claim 1, wherein the transflective surface is smooth.

7. The lighting assembly of claim 1, wherein the transflective surface is structured.

8. The lighting assembly of claim 1, wherein the transflective surface includes a first region with a first group of structures and a second region with a different second group of structures.

9. The lighting assembly of claim 1, wherein the reflector comprises first and second areas of reflectivity, the first area of reflectivity being more reflective at a first wavelength than the second area of reflectivity, the second area of reflectivity more reflective at a different second wavelength than the first area of reflectivity.

10. The light assembly of claim 1 having a length to depth ratio greater than 5:1.

11. The light assembly of claim 1 in the form of a vehicle tail light assembly.

12. An article comprising:
    a transflective surface having a reflectivity greater than dictated by Fresnel equation at normal incidence:

$$R = \frac{(n-1)^2}{(n+1)^2},$$

where R is reflectance at normal incidence and n is a refractive index of the material; and
a reflector facing the transflective surface and substantially parallel to at least 30 percent by area of the transflective surface.

* * * * *